(12) United States Patent
Namiki et al.

(10) Patent No.: US 6,937,263 B2
(45) Date of Patent: Aug. 30, 2005

(54) IMAGE FORMING APPARATUS AND LIGHT AMOUNT CORRECTION METHOD

(75) Inventors: Teruhiko Namiki, Shizuoka (JP); Katsuhiro Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/176,602

(22) Filed: Jun. 24, 2002

(65) Prior Publication Data

US 2003/0007054 A1 Jan. 9, 2003

(30) Foreign Application Priority Data

Jun. 28, 2001 (JP) ........................................ 2001-196409

(51) Int. Cl.$^7$ .............................................. B41J 2/435
(52) U.S. Cl. ..................... 347/248; 250/559.1; 399/43; 400/708
(58) Field of Search ........................ 250/559.1; 347/14, 347/19, 229, 234, 248; 358/1.18; 399/16, 18, 43, 47; 400/708

(56) References Cited

U.S. PATENT DOCUMENTS 4,364,062 A * 12/1982 Matsui ........................ 347/14
5,294,959 A * 3/1994 Nagao et al. ................. 399/44
5,754,195 A * 5/1998 Yokono ....................... 347/19
6,352,332 B1 * 3/2002 Walker ........................ 347/19
6,361,139 B1 * 3/2002 Gomez et al. ................ 347/19

* cited by examiner

Primary Examiner—Lamson Nguyen
Assistant Examiner—Blaise Mouttet
(74) Attorney, Agent, or Firm—Fitzpatrick, Cella, Harper & Scinto

(57) ABSTRACT

An image forming apparatus including a detector, a write controller, and a light controller. The detector detects, with an optical sensor, an edge of a recording medium in a direction perpendicular to a reading medium convey direction. The write controller shifts an image write position in the direction perpendicular to the recording medium convey direction on the basis of a detection result of the detector. The light controller controls a light emission amount of the optical sensor to set an output of the optical sensor to a predetermined value at a predetermined portion in an area where the detection result of the optical sensor is effective.

23 Claims, 21 Drawing Sheets

RECORDING MEDIUM

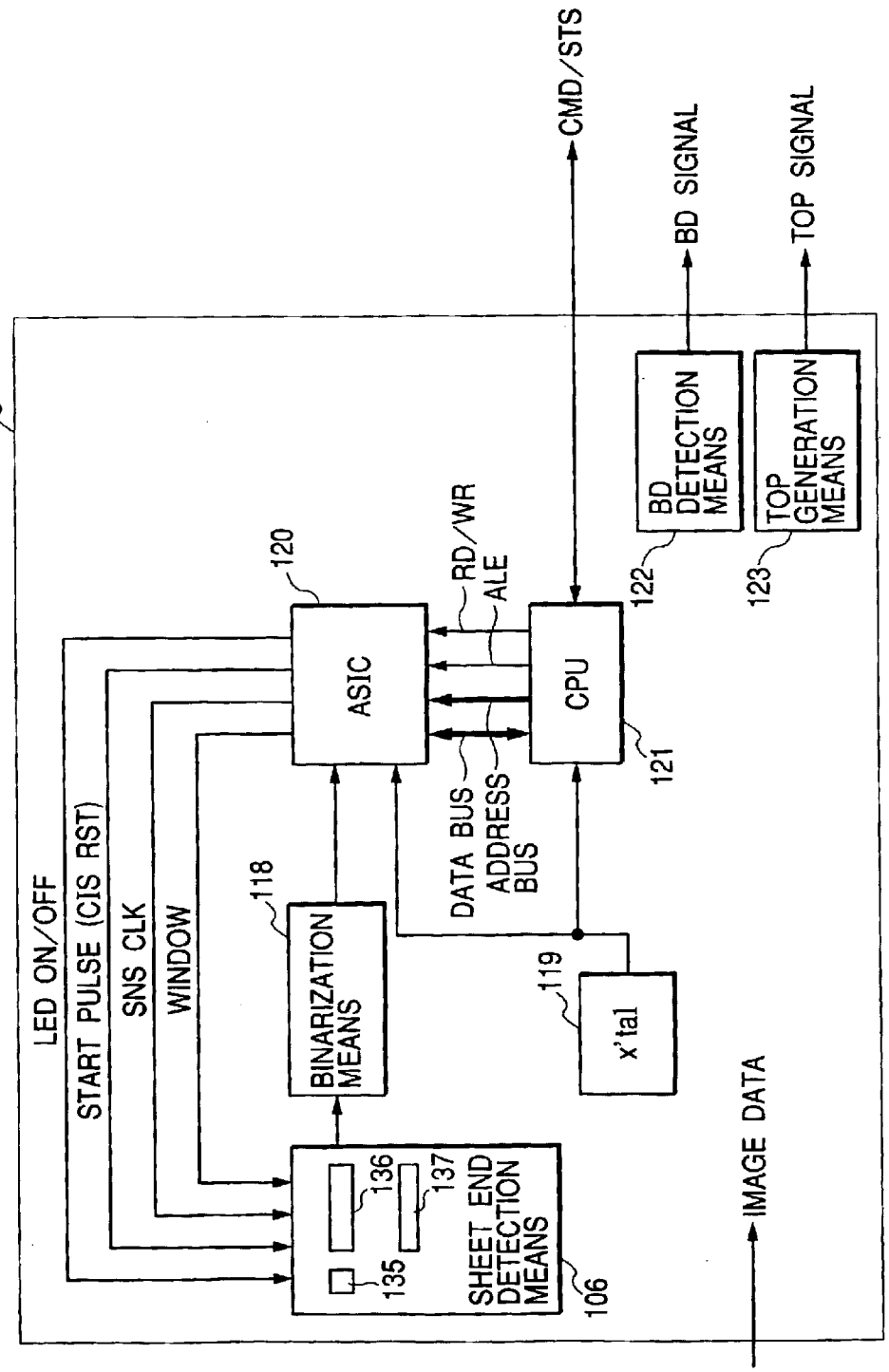

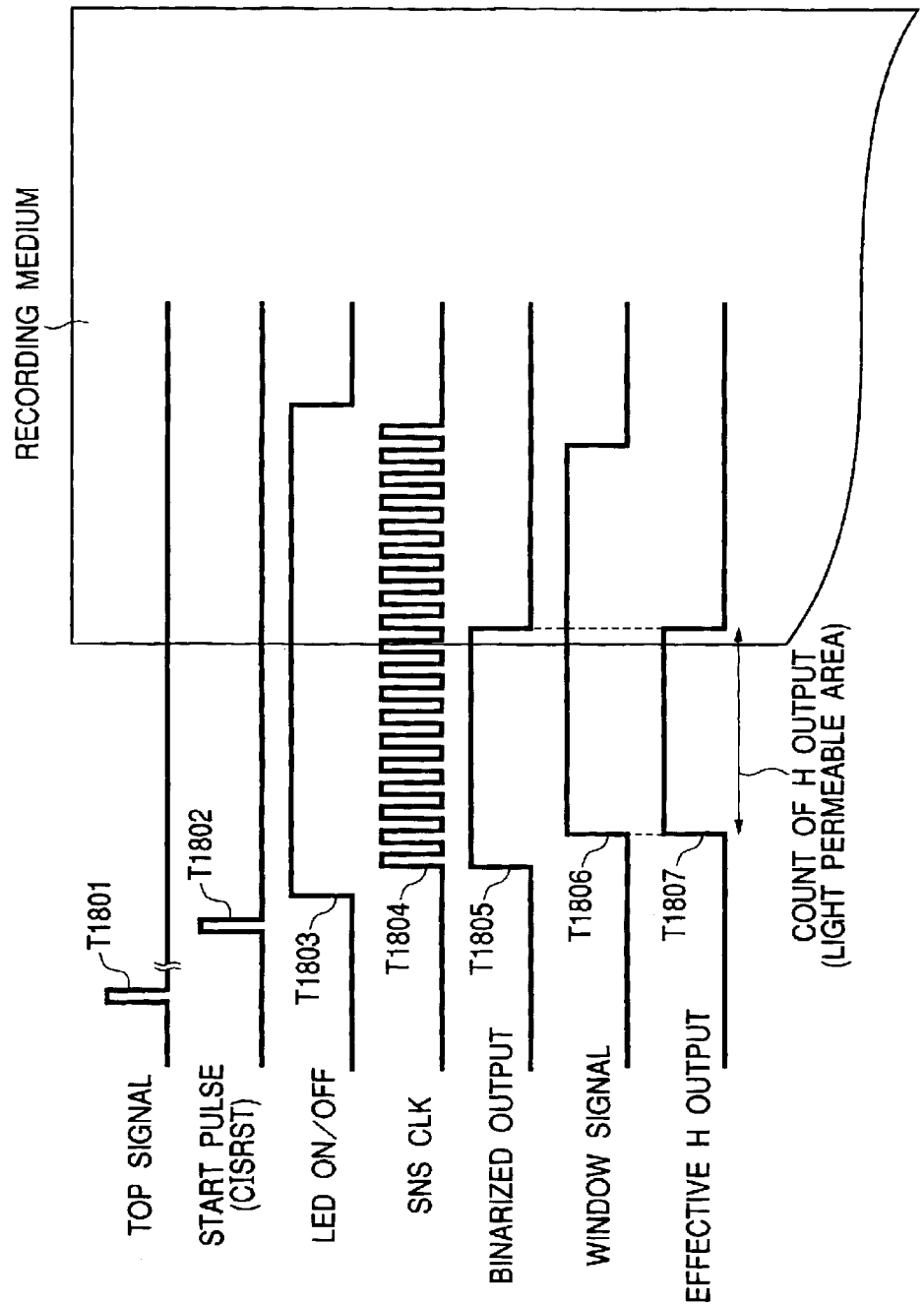

IMAGE FORMING APPARATUS AND LIGHT AMOUNT CORRECTION METHOD

BACKGROUND OF THE INVENTION

1. Field of the Invention

The present invention relates to an image forming apparatus such as a copying machine or printer using electrophotography and, more particularly, to an image forming apparatus having a control means for detecting an end of a recording medium by a photosensor, and correcting and controlling an image write position in a direction (main scanning direction) perpendicular to the convey direction of the recording medium on the basis of the detection result.

2. Related Background Art

FIG. 17 shows a method of determining an image write position in a direction (main scanning direction) perpendicular to the convey direction of a recording medium in a conventional image forming apparatus.

To record image information in a conventional image forming apparatus, the image forming apparatus comprises a convey guide 101 as a reference, as shown in FIG. 17. A recording medium 102 is conveyed while either a right or left end in the main scanning direction with respect to the recording medium convey direction abuts against the convey guide 101. For example, when the left side serves as the image write reference of the recording medium 102, the left end of the recording medium 102 abuts against the convey guide to convey the recording medium 102. With this arrangement, the recording medium 102 can always be conveyed at the same position, and image information can always be recorded at the same position on the recording medium 102 with respect to the end of the recording medium 102.

As a method of not moving a recording medium, the positional shift (deviation) amount of the recording medium in the main scanning direction is detected, and the image write timing is corrected. FIG. 18 shows a conventional image write timing correction method.

A sheet end detection means 103 is mechanically driven using a motor (not shown) or the like with respect to the recording medium 102. The sheet end detection means 103 passes the end of the recording medium 102, and then an output from the sheet end detection means 103 changes. The image forming apparatus calculates, e.g., a moving distance until the output changes after the start of moving the sheet end detection means 103 on the basis of the rotation amount of the motor. The image forming apparatus corrects the image write timing on the basis of the calculation result.

As a means for detecting the end of a recording medium without moving the sheet end detection means, a photosensor can be used. A conventional method of detecting the end of a recording medium by using a photosensor will be explained. FIG. 19 is a block diagram showing the image forming apparatus.

A controller 104 sends image data to a printer engine 105 on the basis of a horizontal sync signal (BD signal) and vertical sync signal (TOP signal) sent from the printer engine 105. For example, the controller 104 sends image data to the printer engine 105 on the basis of the horizontal sync signal (BD signal) upon reception of the vertical sync signal (TOP signal) sent from the printer engine 105.

FIG. 20 is a schematic view showing the printer engine 105. The printer engine 105 includes a sheet end detection means 106, a registration roller 107, an attraction roller 108 which makes an electrostatic convey belt 113 attract a recording medium, image forming portions 109 to 112, the electrostatic convey belt 113, a feed unit 114, a fixing device 115, a fixing/discharge portion 116, and double-side convey portion 117.

The outline of an image forming operation will be described by exemplifying double-side recording, with reference to FIGS. 19 and 20.

An image is formed on the second surface (lower surface) of a recording medium. The recording medium is conveyed from the feed unit 114, and the registration roller 107 removes any skew. The sheet end detection means 106 between the registration roller 107 and the attraction roller 108 detects the sheet end (e.g., left end) of the recording medium in the main scanning direction. Then, the recording medium is attracted by the electrostatic convey belt 113 by using the attraction roller 108, and conveyed to the image forming portions 109 to 112.

The sheet end detection means 106 uses a photosensor to detect a recording medium in a noncontact state.

The printer engine 105 notifies the controller 104 of positional information about the detected end of the recording medium as status information. The controller 104 controls the image data transmission timing to the printer engine 105 on the basis of that received positional information. The controller 104 adjusts the image write position in the main scanning direction. An image is formed on the recording medium at the image forming portions 109 to 112.

The image formed on the recording medium is fixed as a permanent image onto the recording medium by heat and pressure at the fixing device 115. The recording medium is discharged by a predetermined amount from the fixing/discharge portion 116, and then the fixing/discharge portion 116 is reversely rotated to convey the recording medium to the double-side convey portions 117.

The recording medium reaches the registration roller 107 again through the double-side convey portions 117, and the registration roller 107 removes any skew. The sheet end detection means 106 detects the sheet end (e.g., left end) of the recording medium in the main scanning direction again, and an image is formed on the first surface (front surface) by the same method as that for the image on the second surface (back surface).

A method of detecting the end of a recording medium will be described. FIGS. 21 and 22 show the sheet end detection means. The sheet end detection means is made up of an LED 135, a transparent material 136 which guides light from the LED 135, and a CIS (Contact Image Sensor) 137 which detects light from the LED 135 as an analog signal.

FIG. 23 is a control block diagram showing the sheet end detection means, and FIG. 24 is a timing chart of the sheet end detection means. The printer engine 105 comprises the sheet end detection means 106, a binarization means 118, an oscillation unit (X' tal) 119, an ASIC 120, a CPU 121, a BD detection means 122 which receives a BD signal serving as the reference of an image write position in the main scanning direction, and a TOP generation means 123 which generates a TOP signal serving as the reference of an image write position in the subscanning direction.

A TOP signal serving as the reference of an image write position in the subscanning direction is generated (T1801). At a predetermined timing, a detection start signal Start Pulse is input from the ASIC 120 to the sheet end detection means 106 (T1802). Start Pulse is used as a reset pulse for a CIS 34 and initializes the CIS 34. The LED 135 is turned on by an LED ON/OFF signal from the ASIC 120 (T1803).

The LED 135 emits light under predetermined driving conditions, and the light from the LED 135 irradiates the CIS 34 via the transparent material 136. The CIS output changes to "H" at a portion irradiated with light, whereas the CIS output changes to "L" at a portion where light is shielded by a recording medium. After that, a detection clock SNS CLK is input from the ASIC 120 to the sheet end detection means 106 (T1804).

The sheet end detection means 106 outputs the detection results of the CIS 34 as analog signals sequentially from the end in synchronism with the clock pulse SNS CLK. An output (analog output) from the sheet end detection means 106 is binarized by the binarization means 118 and input to the ASIC 120 (T1805).

The ASIC 120 generates a WINDOW signal which enables an output from the binarization means 118 (T1806). During the effective (H) period of the WINDOW signal, the ASIC 120 counts the number of H outputs from the binarization means 118 in synchronism with the clock pulse SNS CLK (T1807).

The CPU 121 calculates the distance of a light permeable portion in the sheet end detection means 106 from the count result, and detects the end of the recording medium.

The controller 104 is notified of positional information about the end of the recording medium as status information.

In the conventional image forming apparatus, a recording medium is mechanically moved to a normal position during the conveyance of the recording medium, as shown in FIG. 17. When recording media subjected to recording processing have a variety of sizes, it is difficult to move recording medium of all sizes to the normal position.

To mechanically move a recording medium during conveyance, the recording medium must be released from the convey means. This is difficult to realize when the recording medium is conveyed vertically from a lower portion to an upper portion or from an upper portion to a lower portion.

It is therefore difficult to always maintain the same image write position with respect to the recording medium at low cost and high precision.

Particularly when an image on the second surface is recorded in double-side recording, the convey path of a recording medium is unstably long and the image write position is more difficult to match.

In the method of moving the sheet end detection means to detect the positional shift amount of a recording medium and correcting the image write position, the detection means must be mechanically driven to a position where the means can detect at least either the right or left end of the recording medium with respect to the convey direction. The apparatus requires a bulky arrangement and cannot be downsized.

Further, a motor for driving the detection means is needed, resulting in an expensive system.

In the method of detecting the end position of a recording medium and correcting the image write position in accordance with the detected end position of the recording medium, the end position of the recording medium may be erroneously detected. In this case, the image write position is controlled based on the erroneously detected result.

Especially when a photosensor is used as a means for detecting the end position of a recording medium, the light emission portion of the photosensor keeps driving conditions constant. For example, the light amount of the light emission side decreases, failing to obtain a predetermined sensor output due to a decrease in the light amount of the light emission portion in accordance with the service life, or dust at the light emission portion under the influence of toner scattering or the like caused by long-term use in the image recording apparatus.

Alternatively, the light receiving amount decreases due to dust at the light receiving portion, and a predetermined sensor output cannot be attained.

As a result, image information cannot be recorded at a normal position on a recording medium.

SUMMARY OF THE INVENTION

It is an object of the present invention to stably correct and control the image write position of a recording medium in the main scanning direction at low cost and high precision in an image forming apparatus having a control means for detecting the end of a recording medium by a photosensor, and correcting and controlling the image write position in the main scanning direction on the basis of the detection result.

To achieve the above object, according to the present invention, there is provided an image forming apparatus including detection means for detecting an end position of a recording medium by a photosensor, control means for correcting an image write position in a direction perpendicular to a recording medium convey direction on the basis of a detection result of the detection means, and correction means for correcting a light emission amount of the photosensor.

The above and other objects, features, and advantages of the present invention will be apparent from the following detailed description of the preferred embodiments in conjunction with the accompanying drawings.

BRIEF DESCRIPTION OF THE DRAWINGS

FIG. 23 is a control block diagram showing the conventional sheet end detection means; and FIG. 24 is a timing chart of the conventional sheet end detection means.

DETAILED DESCRIPTION OF THE PREFERRED EMBODIMENTS (First Embodiment)

An image forming apparatus according to the first embodiment of the present invention will be described with reference to the accompanying drawings. In the first embodiment, the light amount of a sheet end detection means is not kept at a constant value but is set to a light amount optimal for detection at a predetermined timing.

Figure 1:
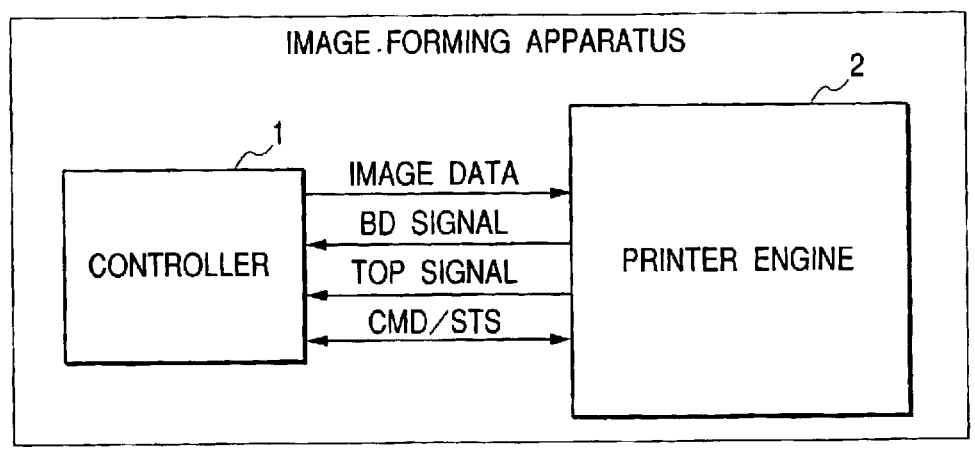
FIG. 1 is a block diagram showing an image forming apparatus according to a first embodiment.

FIG. 1 is a block diagram showing the image forming apparatus. A controller 1 as a control means sends image data to a printer engine 2 on the basis of a horizontal sync signal (BD signal) and vertical sync signal (TOP signal) sent from the printer engine 2. The controller 1 sends image data to the printer engine 2 on the basis of a horizontal sync signal (BD signal) upon reception of a vertical sync signal (TOP signal) sent from the printer engine 2.

Figure 2:
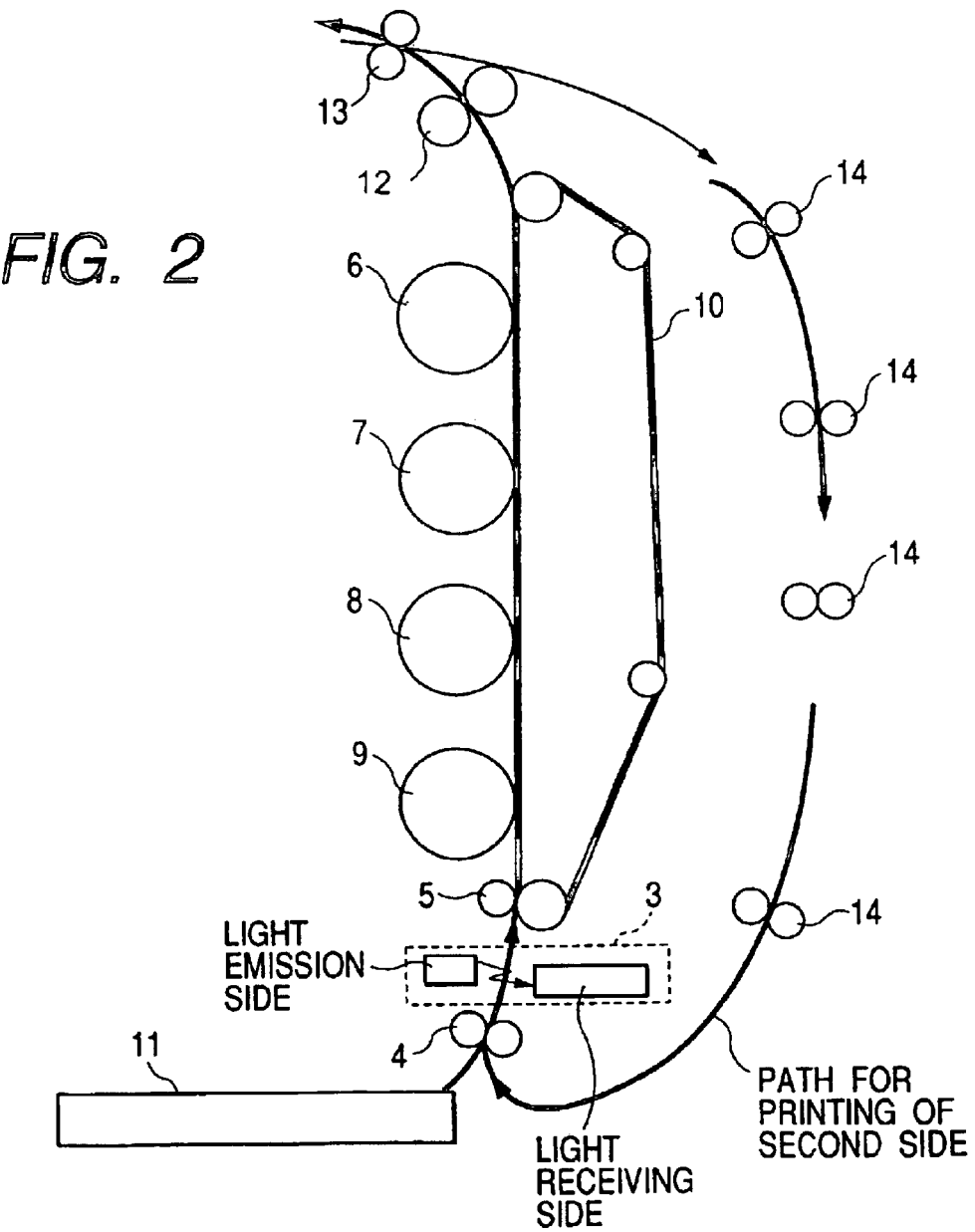
FIG. 2 is a schematic view showing a printer engine.

FIG. 2 is a schematic view showing the printer engine. The printer engine includes a sheet end detection means 3, a registration roller 4, an attraction roller 5, which makes an electrostatic convey belt attract a recording medium, image forming portions 6 to 9, an electrostatic convey belt 10, a feed unit 11, a fixing device 12, fixing/discharge portions 13, and double-side convey portions 14.

The outline of an image forming operation will be described by exemplifying double-sided recording with reference to FIGS. 1 and 2.

An image is formed on the second surface (back surface) of a recording medium. The recording medium is conveyed from the feed unit 11, and the registration roller 4 removes any skew. The sheet end detection means 3 between the registration roller 4 and the attraction roller 5 detects the sheet end (e.g., left end) of the recording medium in the main scanning direction. Then, the recording medium is attracted by the electrostatic convey belt 10 by using the attraction roller 5, and conveyed to the image forming portions 6 to 9.

The sheet end detection means 3 uses a photosensor so as to detect a recording medium in a noncontact state.

The printer engine 2 notifies the controller 1 of positional information about the detected end of the recording medium as status information. The controller 1 controls the image data transmission timing to the printer engine 2 on the basis of the received positional information about the end of the recording medium. The controller 1 adjusts the image write position in a direction perpendicular to the recording medium convey direction. An image is formed on the recording medium at the image forming portions 6 to 9.

The image formed on the recording medium is fixed as a permanent image onto the recording medium by heat and pressure at the fixing device 12. The recording medium is discharged by a predetermined amount from the fixing/discharge portions 13, and then the fixing/discharge portions 13 are reversely rotated to convey the recording medium to the double-side convey portions 14.

The recording medium reaches the registration roller 4 again through the double-side convey portions 14, and the registration roller 4 removes any skew. The sheet end detection means 3 detects the sheet end (e.g., left end) of the recording medium in the main scanning direction again, and an image is formed on the first surface (front surface) by the same method as that for the image on the second surface (back surface).

Figure 3:
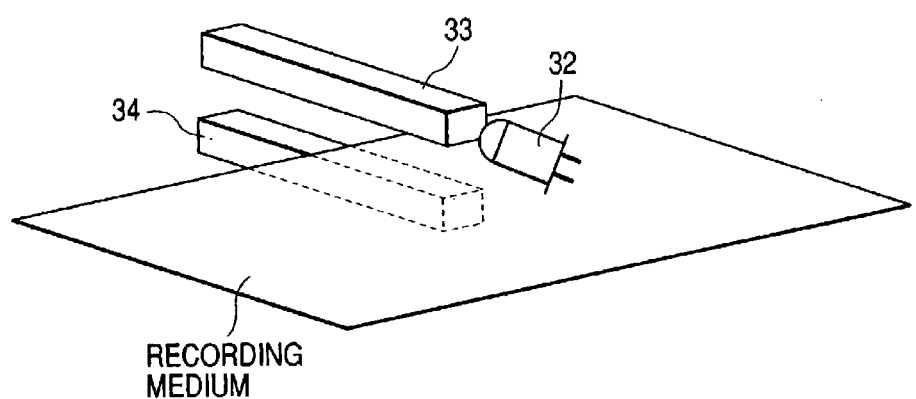
FIG. 3 is a perspective view showing sheet end detection means.
Figure 4:
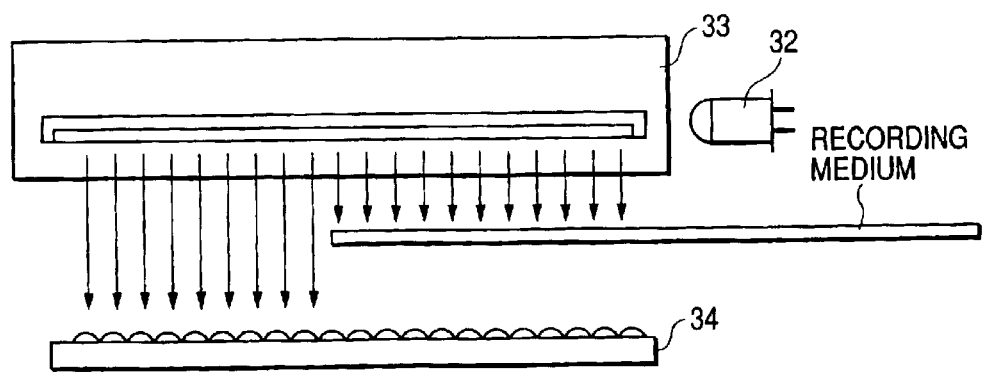
FIG. 4 is a sectional view showing the sheet end detection means.

A method of detecting the end of a recording medium will now be described. FIGS. 3 and 4 show sheet end detection means. The sheet end detection means includes an LED 32, a transparent material 33 which guides light from the LED 32, and a CIS (Contact Image Sensor) 34 which detects light from the LED 32 as an analog signal. In this embodiment, the LED 32, transparent material 33, and CIS 34 constitute the sheet end detection means 3 (see FIG. 2).

Figure 5:
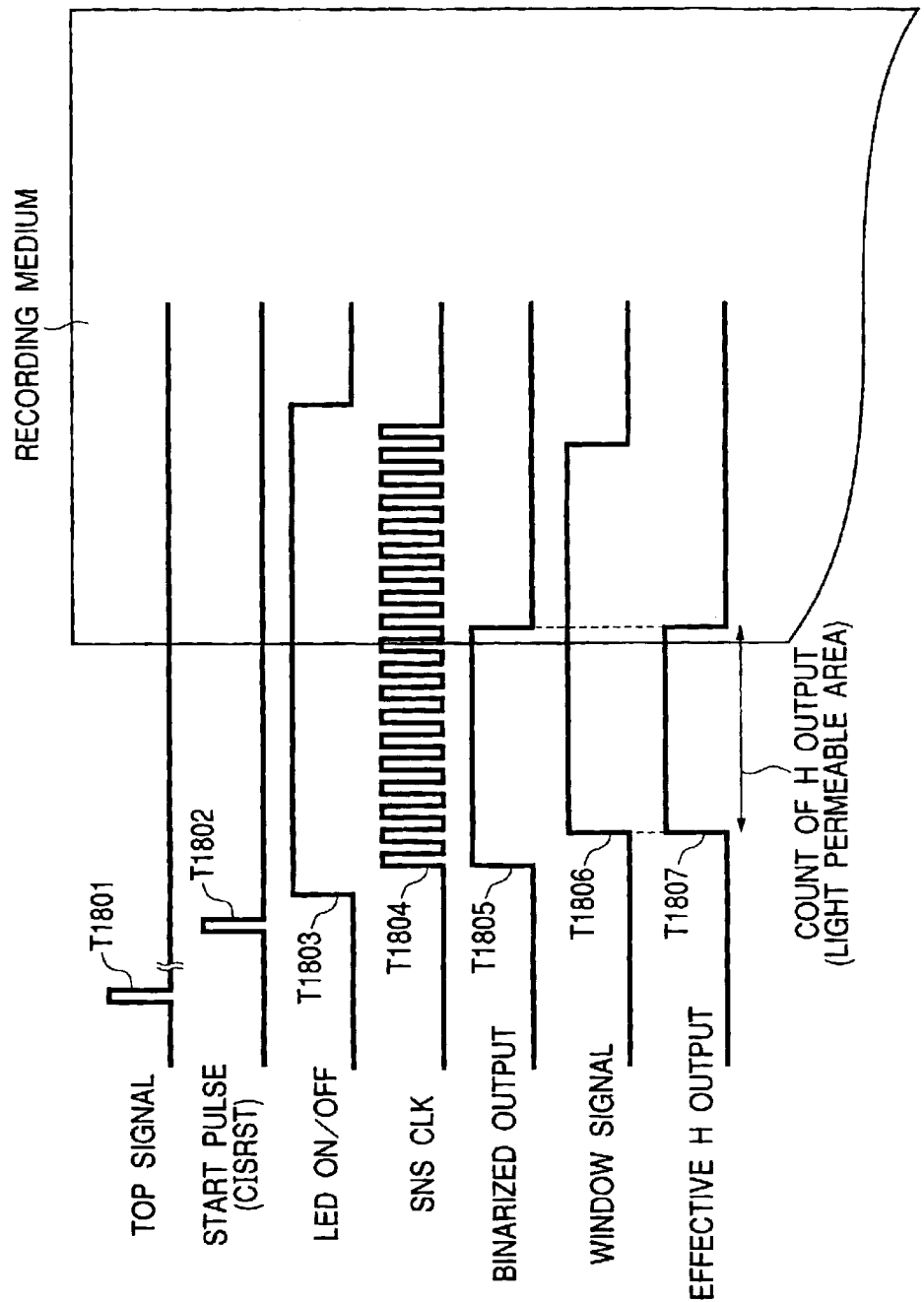
FIG. 5 is a timing chart of the sheet end detection means.
Figure 6:
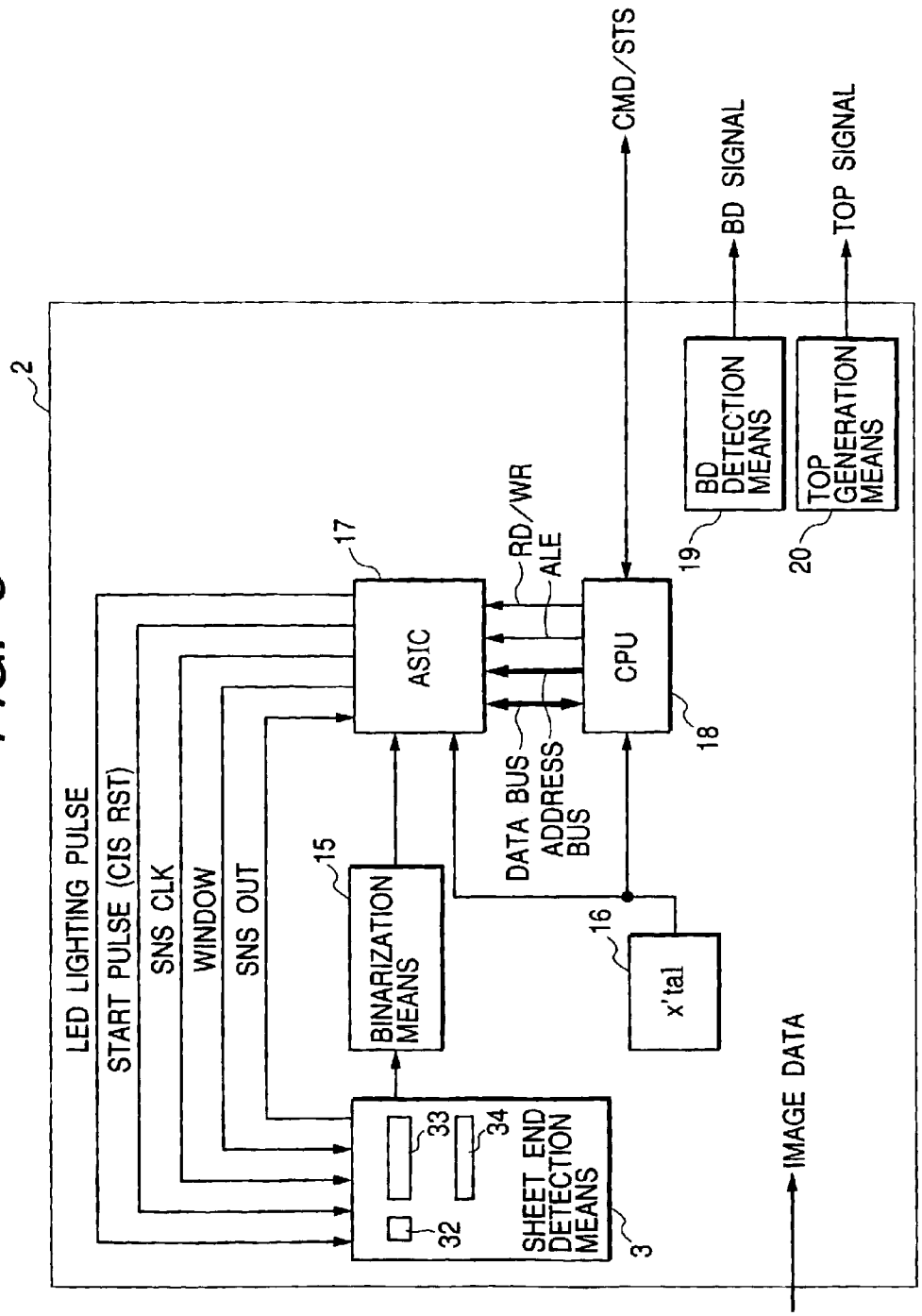
FIG. 6 is a block diagram showing correction control of an image write position.

FIG. 6 is a block diagram showing correction control of the image write position by using a photosensor, and FIG. 5 is a timing chart of optical detection means. The printer engine 2 comprises the sheet end detection means 3, binarization means 15, an oscillation unit (X'tal) 16, an ASIC 17, a CPU 18, BD detection means 19 which receives a BD signal serving as the reference of an image write position in the main scanning direction, and TOP generation means 20, which generates a TOP signal serving as the reference of an image write position in the subscanning direction.

In the first embodiment, the LED 32 emits pulses. Further, this embodiment adopts an SNS OUT signal for inputting an output from the sheet end detection means 3 to the internal A/D converter of the ASIC 17 in addition to the binarization means 15.

A TOP signal serving as the reference of an image write position in the subscanning direction is generated (T1801). At a predetermined timing, a detection start signal Start Pulse is input from the ASIC 17 to the sheet end detection means 3 (T1802). Start Pulse is used as a reset pulse for the CIS 34 and initializes the CIS 34. The LED 32 is turned on by an LED ON/OFF signal from the ASIC 17 (T1803).

The LED 32 emits light under predetermined driving conditions, and the light from the LED 32 irradiates the CIS 34 via the transparent material 33. The CIS output changes to "H" at a portion irradiated with light, whereas the CIS output changes to "L" at a portion where light is shielded by a recording medium. After that, a detection clock SNS CLK is input from the ASIC 17 to the sheet end detection means 3 (T1804).

The sheet end detection means 3 outputs the detection results of the CIS 34 as analog signals sequentially from the end in synchronism with the clock pulse SNS CLK. An output (analog output) from the sheet end detection means 3 is binarized by the binarization means 15 and input to the ASIC 17 (T1805).

The ASIC 17 generates a WINDOW signal which enables an output from the binarization means 15 (T1806). During the effective (H) period of the WINDOW signal, the ASIC 17 counts the number of H outputs from the binarization means 15 in synchronism with the clock pulse SNS CLK (T1807).

The CPU 18 calculates the distance of a light permeable portion in the sheet end detection means 3 from the count result, and detects the end of the recording medium.

The controller 1 is notified of positional information about the end of the recording medium as status information.

Figure 7:
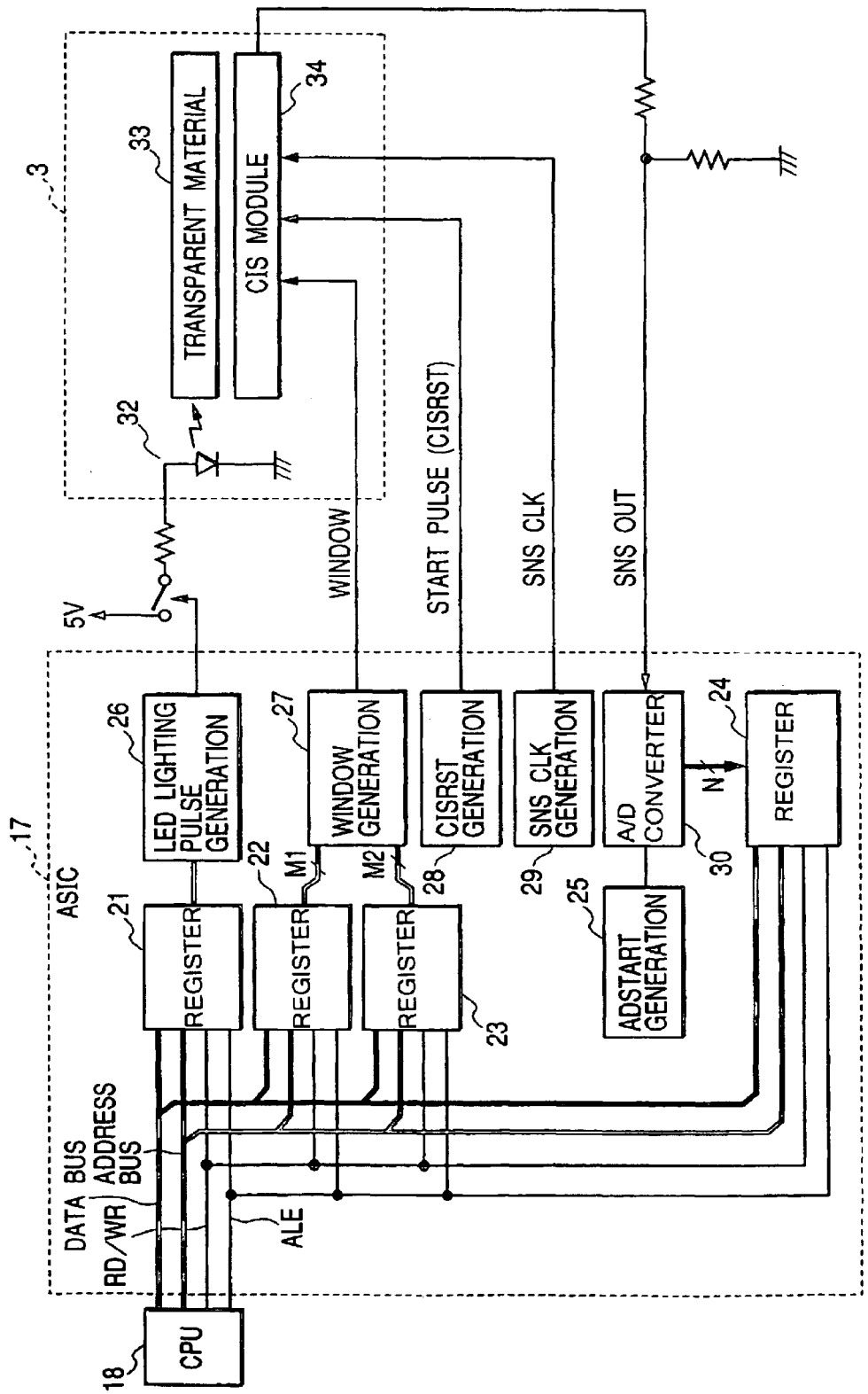
FIG. 7 is a block diagram showing an ASIC.
Figure 8:
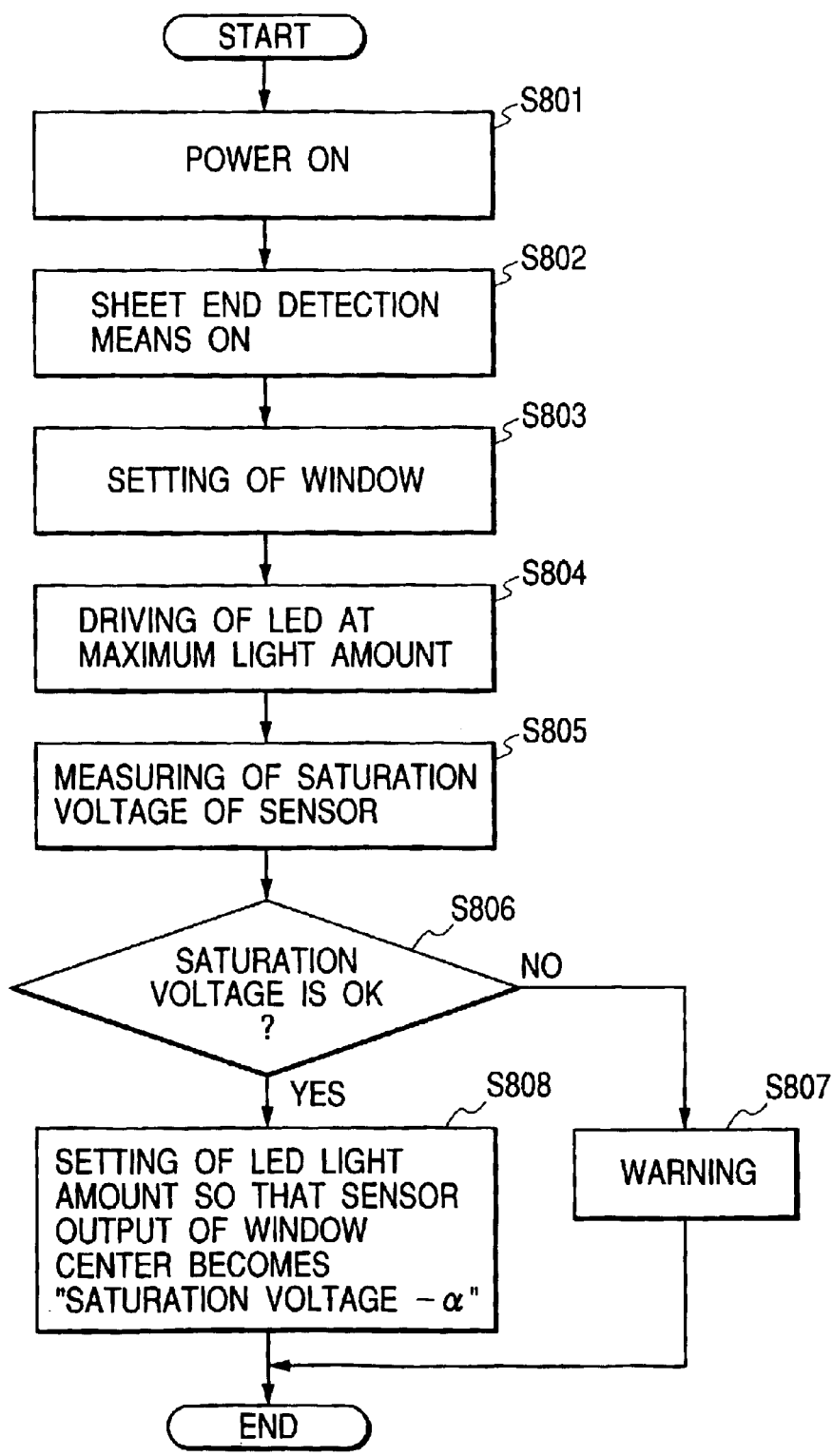
FIG. 8 is a flow chart showing setting of the light amount of the sheet end detection means.

FIG. 7 is a block diagram showing the ASIC in the first embodiment, and FIG. 8 is a flow chart showing setting of the light amount of the sheet end detection means in the first embodiment. The ASIC comprises an LED lighting pulse register 21, effective range setting registers 22 and 23, an A/D converter register 24, an A/D conversion start signal generation unit (to be referred to as an ADSTART generation unit hereinafter) 25 which controls a timing when a digital value detected by an A/D converter is stored in the register, an LED lighting pulse generation unit 26 which causes the LED to emit light as pulses on the basis of the register value, an effective range setting register generation unit (to be referred to as a WINDOW generation unit hereinafter) 27 which determines the effective period of a CIS output, a Start Pulse generation unit (to be referred to as a CISRST generation unit hereinafter) 28 which generates a CISRST signal for resetting the sheet end detection means 3, a sync clock generation unit (to be referred to as a SNS CLK generation unit hereinafter) 29 which supplies CLK to the sheet end detection means 3, and an A/D converter 30 which converts an analog input into a digital value.

Light amount setting operation of the sheet end detection means in the first embodiment will be explained with reference to FIGS. 7 and 8.

After the printer engine 2 is powered on in S801, the CISRST generation unit 28 outputs an "L" CISRST signal to turn on the sheet end detection means 3 in S802. In S803, the CPU 18 sets a value in the effective range setting registers 22 and 23 which determine an area corresponding to the size of a recording medium in the main scanning direction.

The WINDOW generation unit 27 generates a WINDOW signal near the end of the recording medium on the basis of the value set in the effective range setting registers 22 and 23. An output from the CIS 34 becomes effective only in an area where the WINDOW is set. The LED 32 is driven at a maximum light amount (full lighting of the LED) in S804, and the saturation voltage of the sheet end detection means 3 is measured in S805.

The saturation voltage is measured by, e.g., the following method.

The CIS 34 outputs an analog value SNS OUT in synchronism with a clock SNS CLK supplied from the SNS CLK generation unit 29 of the ASIC 17. The A/D converter 30 in the ASIC 17 converts the analog value SNS OUT into a digital value at a timing based on a signal from the ADSTART generation unit 25, and stores the digital value in the A/D converter register 24. The CPU 18 writes the value of the A/D converter register 24 in a RAM area (not shown).

This operation is repeated while the WINDOW is active. The CPU 18 calculates the maximum output voltage value of the CIS 34 in the WINDOW active period, and sets the maximum voltage value as the saturation voltage of the sheet end detection means 3.

After the saturation voltage is measured, whether the saturation voltage is a predetermined voltage or more is checked in S806. If NO in S806, it is determined in S807 that the sheet end detection means 3 fails or a recording medium or the like exists in the sheet end detection means 3, and the abnormal state is informed. If YES in S806, the light amount of the LED 32 is set so that the CIS output at the center of the WINDOW active period becomes a "saturation voltage $-\alpha$".

The light amount of the LED 32 is controlled by changing the lighting time of the LED 32 as follows.

First, the CPU 18 sets an LED lighting time per unit time in the LED lighting pulse register 21 of the ASIC 17. Then, the ASIC 17 causes the LED lighting pulse generation unit 26 to generate an LED lighting pulse on the basis of the value of the LED lighting pulse register 21.

Figure 9:
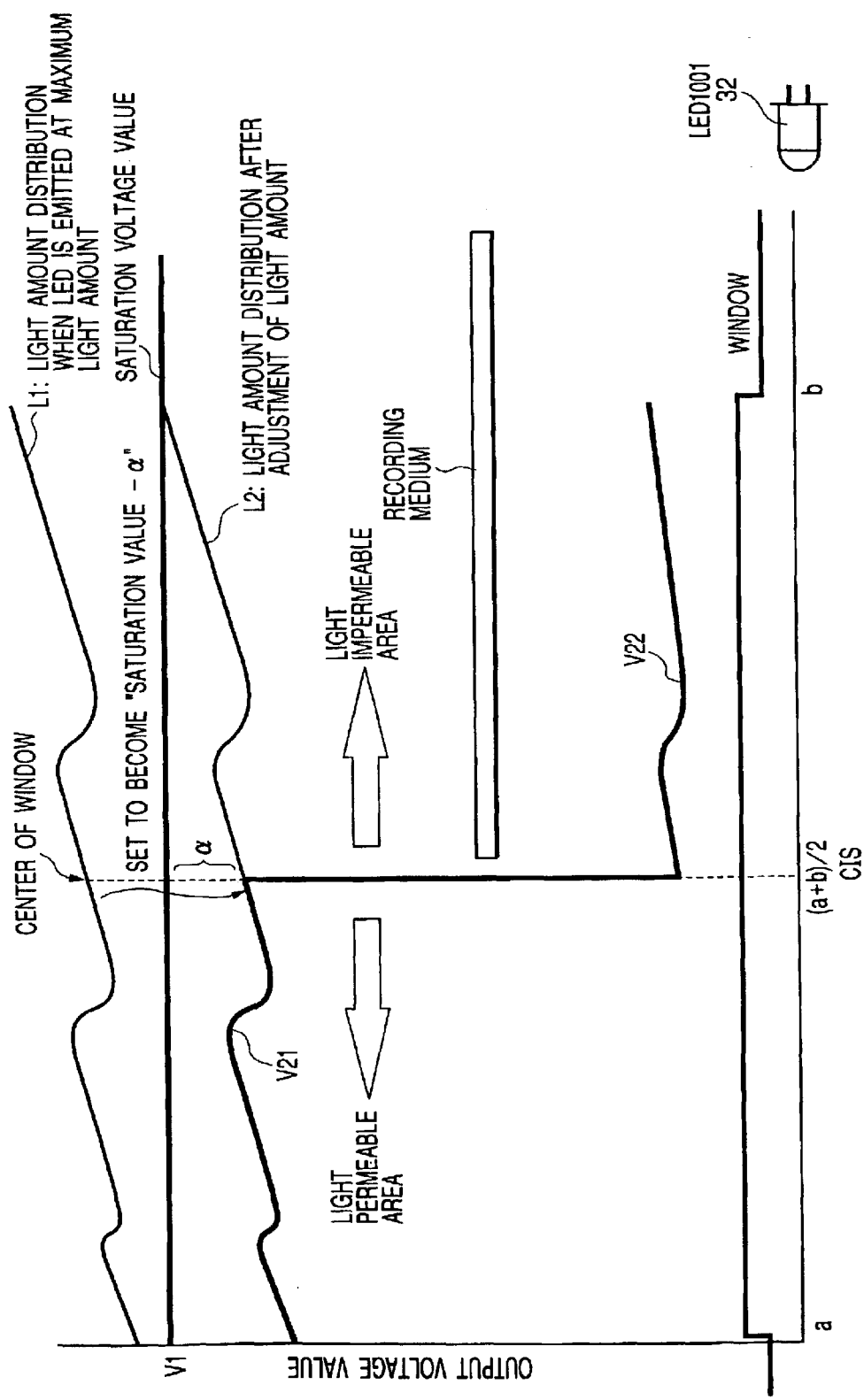
FIG. 9 is a graph showing the output voltage distribution of the sheet end detection means.

FIG. 9 shows the output voltage distribution of the sheet end detection means 3 when a sheet end is detected before/after the LED light amount is set. L1 represents a light amount distribution when the LED 32 is driven at a maximum light amount; L2, a light amount distribution after the LED light amount is adjusted; V1, the output voltage (saturation voltage) of the sheet end detection means 3 when the LED 32 is driven at a maximum light amount; V21, the output voltage of the sheet end detection means 3 in a light permeable area after the LED light amount is adjusted; and V22, the output voltage of the sheet end detection means 3 in a light impermeable area after the LED light amount is adjusted.

Since light is shielded by a recording medium in an area where the recording medium exists, the CIS output voltage decreases.

In the above description, the controller 1 is notified of positional information about a detected end of a recording medium as status information, and corrects the image write position. The image write position correction method is not limited to the above one. For example, a correction amount may be calculated in the printer engine on the basis of positional information about a detected end of a recording medium, and the controller may be notified of the calculation result. Alternatively, the image write timing may be corrected in the printer engine on the basis of positional information about a detected end of a recording medium.

The sheet end detection means 3 uses an LED and transparent material for the light emission portion and a CIS for the light receiving portion, but is not limited to this arrangement. For example, the sheet end detection means 3 may be implemented by another photosensor unit using an LED array for the light emission portion and a CCD sensor and the like for the light receiving portion.

The sheet end detection means 3 is not limited to a light permeable photosensor unit, but may be a reflection photosensor unit.

An electrophotographic 4-drum color image forming apparatus has been described. However, the image forming apparatus is not limited to the 4-drum color type, but may be a 1-drum color image forming apparatus or monochrome image forming apparatus.

In this embodiment, the light amount adjustment point is set to the center of the WINDOW active period. The adjustment point is not limited to the center and may be another point in the WINDOW active period.

As described above, the light amount of the sheet end detection means 3 is not kept at a constant value, but is set such that the CIS output at the center of the WINDOW active period becomes a saturation voltage $-\alpha$ when the saturation voltage is a predetermined voltage or more. Accordingly, the end of a recording medium can always be detected at a proper light amount regardless of the state of the sheet end detection means.

(Second Embodiment)

An image forming apparatus according to the second embodiment of the present invention will be described with reference to the accompanying drawings. The same reference numerals as in the first embodiment denote the same parts, and a repetitive description thereof will be omitted.

In the first embodiment, the light emission amount is corrected such that an output at a predetermined position in an area where the detection result of the optical detection means becomes effective has a predetermined value. In the second embodiment, the light emission amount is corrected such that an output at an output generation portion exhibiting the smallest light receiving amount in the area where the detection result of the optical detection means becomes effective has a predetermined value.

Figure 10:
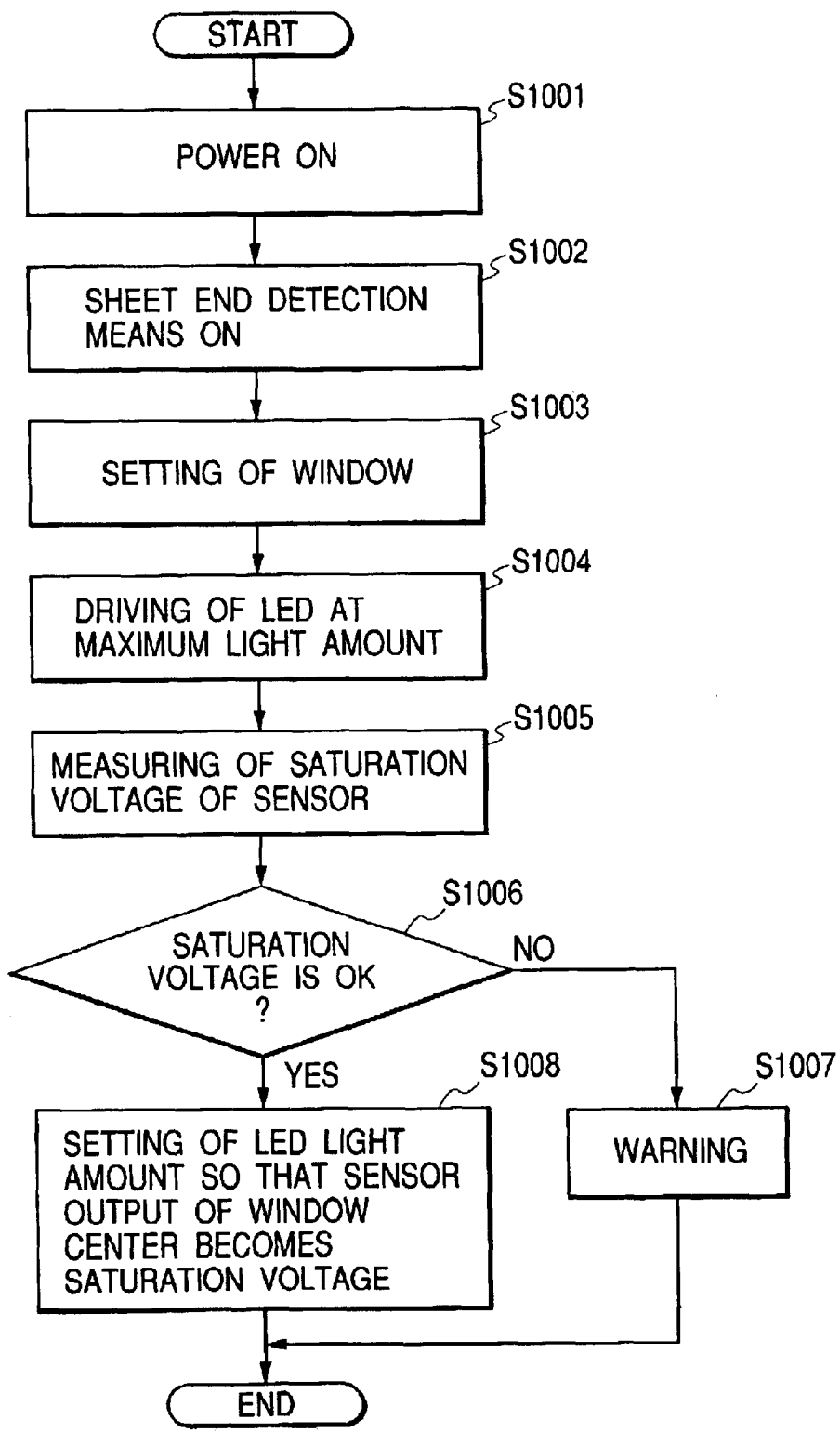
FIG. 10 is a flow chart showing setting of the light amount of a sheet end detection means according to a second embodiment.

FIG. 10 is a flow chart showing setting of the light amount of a sheet end detection means in the second embodiment.

After a printer engine 2 is powered on in S1001, a CISRST generation unit 28 outputs an "L" CISRST signal to turn on a sheet end detection means 3 in S1002.

In S1003, a CPU 18 sets a value in effective range setting registers 22 and 23 which determine an area corresponding to the size of a recording medium in the main scanning direction. A WINDOW generation unit 27 generates a WINDOW signal near the end of the recording medium on the basis of the value set in the effective range setting registers 22 and 23. A CIS 34 becomes effective only in an area where the WINDOW is set. An LED 32 is driven at a maximum light amount in S1004, and the saturation voltage of the sheet end detection means 3 is measured in S1005.

In S1006, whether the saturation voltage is a predetermined voltage or more is checked. If NO in S1006, it is determined in S1007 that the sheet end detection means 3 fails or a recording medium or the like exists in the sheet end detection means 3, and the abnormal state is informed. If YES in S1006, the light amount of the LED 32 is set in S1008 so that the minimum voltage of the sheet end detection means 3 during the WINDOW active period becomes a saturation voltage.

Figure 11:
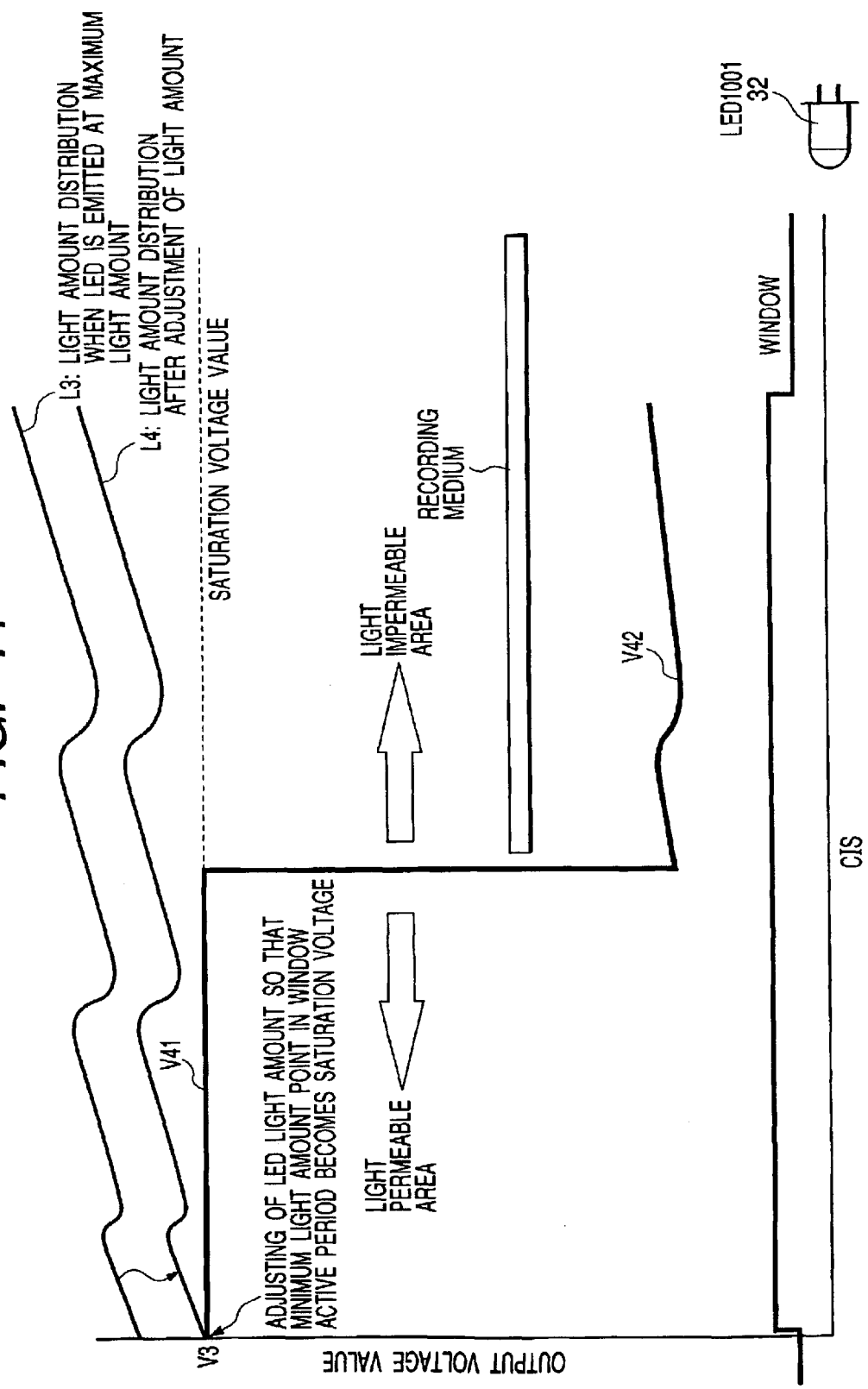
FIG. 11 is a graph showing the output voltage distribution of the sheet end detection means.

FIG. 11 shows the output voltage distribution of the sheet end detection means 3 when a sheet end is detected before/after the LED light amount is set. L3 represents a light amount distribution when the LED 32 is driven at a maximum light amount; L4, a light amount distribution after the LED light amount is adjusted; V3, the output voltage (saturation voltage) of the sheet end detection means 3 when the LED 32 is driven at a maximum light amount; V41, the output voltage of the sheet end detection means 3 in a light permeable area after the LED light amount is adjusted; and V42, the output voltage of the sheet end detection means 3 in a light impermeable area after the LED light amount is adjusted.

Since light is shielded by a recording medium in an area where the recording medium exists, the CIS output voltage decreases.

In this embodiment, the light emission amount is corrected such that an output at an output generation portion exhibiting the smallest light receiving value in the area where the detection result of the optical detection means becomes effective has a predetermined value. The present invention is not limited to this, and the light emission amount may be corrected such that an output at an output generation portion exhibiting the smallest output value in the area where the detection result of the optical detection means becomes effective has a predetermined value.

As described above, the light amount of the sheet end detection means 3 is not kept at a constant value, but is set such that the minimum voltage of the sheet end detection means 3 in the WINDOW active period becomes a saturation voltage when the saturation voltage is a predetermined voltage or more. As a result, the end of a recording medium can always be detected at a proper light amount regardless of the state of the sheet end detection means 3.

(Third Embodiment)

An image forming apparatus according to the third embodiment of the present invention will be described with reference to the accompanying drawings. The same reference numerals as in the first embodiment denote the same parts, and a repetitive description thereof will be omitted.

Figure 12:
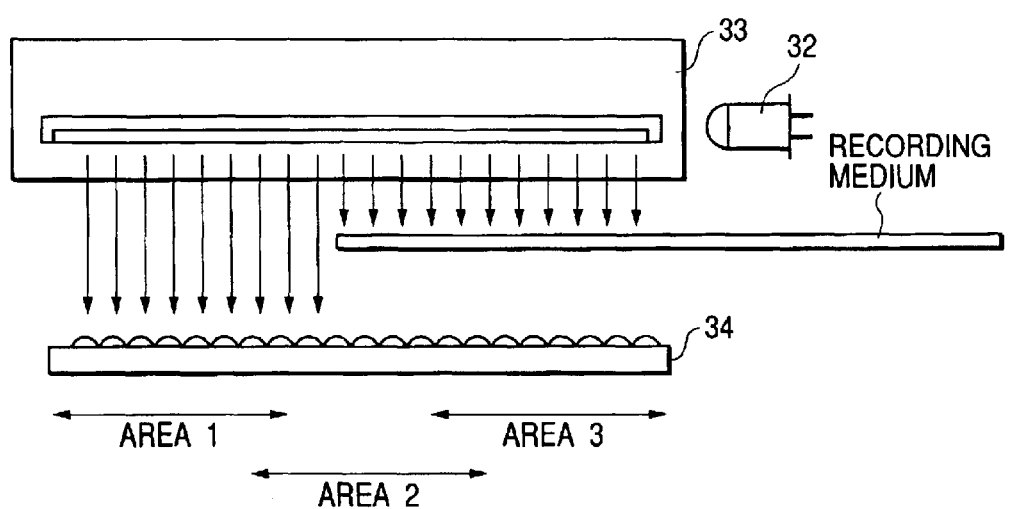
FIG. 12 is a block diagram showing a sheet end detection means according to a third embodiment.
Figure 13:
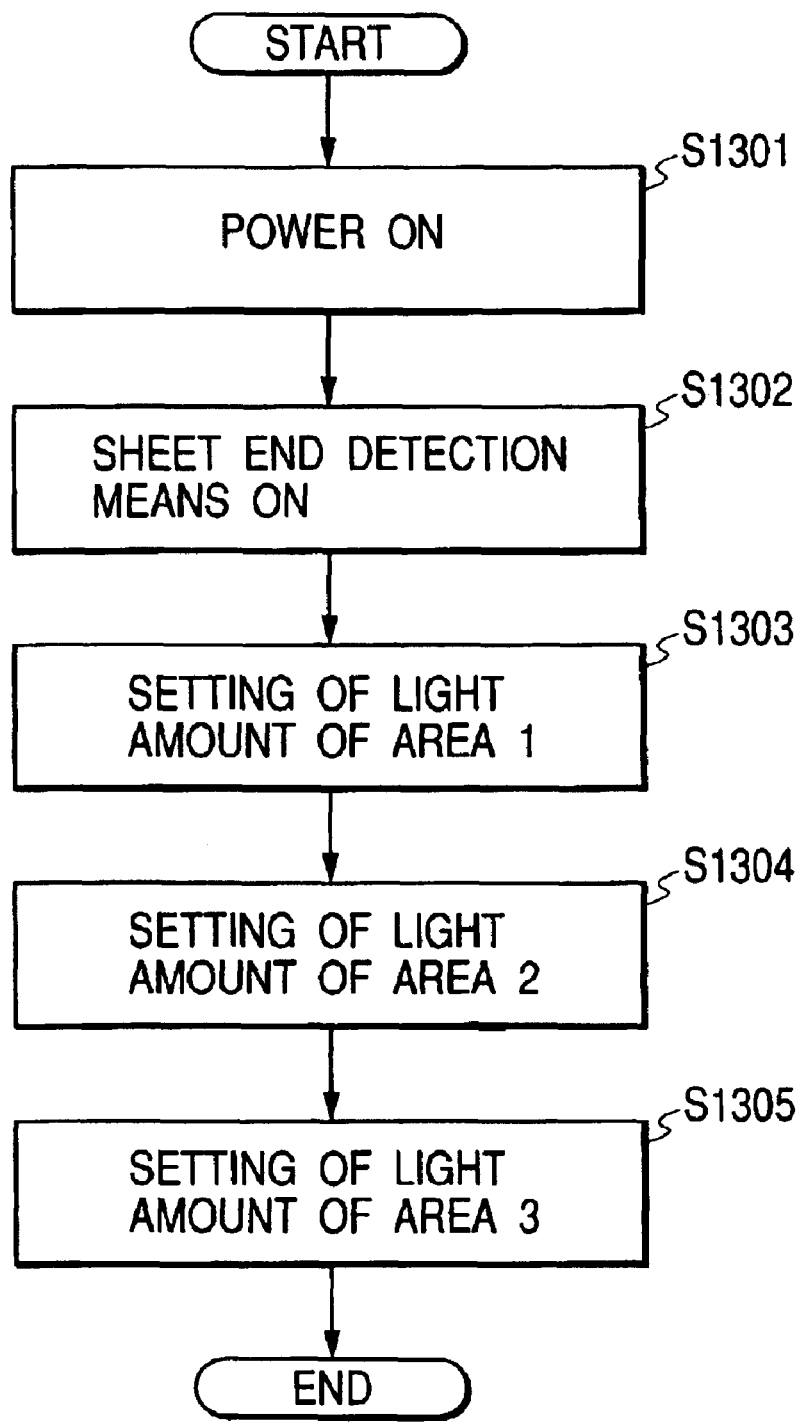
FIG. 13 is a flow chart showing setting of the light amount of the sheet end detection means.

In the third embodiment, the WINDOW active period as an area where the detection result of the optical detection means becomes effective is divided into a plurality of periods. FIG. 12 shows an arrangement when the WINDOW active period is divided into three, and FIG. 13 is a flow chart showing setting of the light amount of a sheet end detection means in the third embodiment.

After a printer engine 2 is powered on in S1301, a sheet end detection means 3 is turned on in S1302, and the light amount of area 1 is set in S1303. The light amount of area 2 is set in S1304, and that of area 3 is set in S1305.

In image formation, the size of a recording medium is detected in advance by a recording medium size detection means (not shown) or the like, and the sheet end is detected only in an area corresponding to the end of the recording medium.

The WINDOW active period is divided into three in this embodiment, but the division number is not limited to three.

As described above, the WINDOW active period is divided into three, the light emission amounts of areas 1 to 3 are corrected, and end detection is executed in an area corresponding to the size of a recording medium detected in advance by the recording medium size detection means or the like. With this arrangement, the end of a recording medium can be detected at an optimal light amount for each recording medium size.

(Fourth Embodiment)

An image forming apparatus according to the fourth embodiment of the present invention will be described with reference to the accompanying drawings. The same reference numerals as in the first embodiment denote the same parts, and a repetitive description thereof will be omitted.

Figure 14:
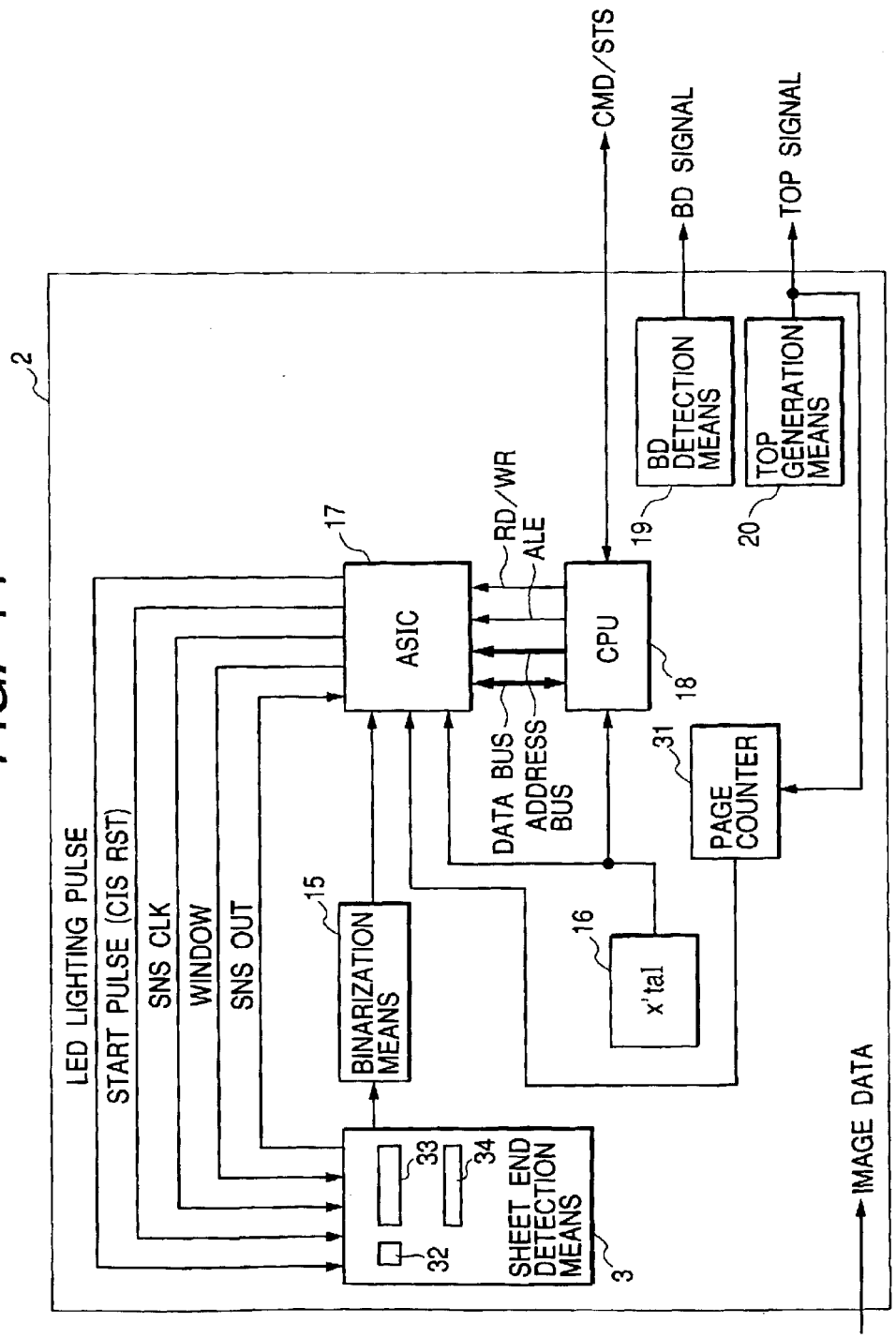
FIG. 14 is a block diagram showing a printer engine according to a fourth embodiment.
Figure 15:
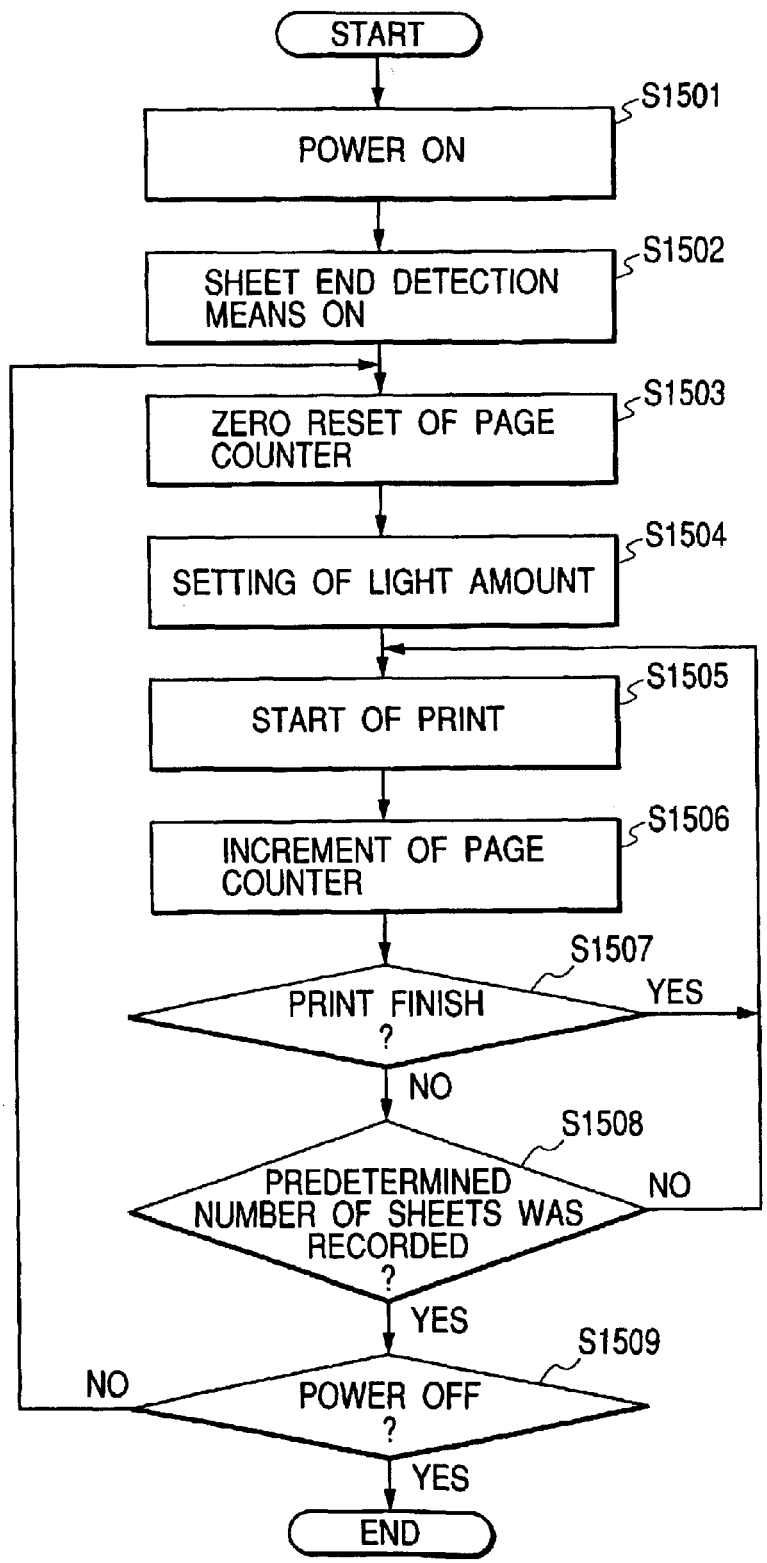
FIG. 15 is a flow chart.

In this embodiment, the light amount of a sheet end detection means 3 is set in accordance with not only activation of the image forming apparatus but also each predetermined number of prints. FIG. 14 is a block diagram showing a printer engine in the fourth embodiment, and FIG. 15 is a flow chart showing the fourth embodiment. A page counter 31 counts the number of prints on the basis of an output signal from a TOP generation means 20.

After a printer engine 2 is powered on in S1501, the sheet end detection means 3 is turned on in S1502. The page counter 31 is reset to zero in S1503, and the light amount of the sheet end detection means 3 is set in S1504. Printing starts in S1505, and the page counter 31 is incremented in S1506. Whether printing has ended is checked in S1507, and if YES, the flow returns to S1505 to wait for the next printing instruction.

If printing continues, whether a predetermined number of sheets have been printed is checked in S1508. If NO in S1508, the flow returns to S1505 to continue printing. If YES in S1508, whether the power supply has been turned off is checked in S1509. If NO in S1509, the flow returns to step S1503 to reset the page counter 31 to zero, and the light amount of the sheet end detection means 3 is set in S1504. If YES in S1509, the flow ends.

In the fourth embodiment, the light amount is set for each predetermined number of prints, but the light amount setting executing timing is not limited to the number of prints. The light amount may be set based on other information, that changes in accordance with the number of prints, such as residual toner amount detection information.

As described above, the light emission amount is corrected on the basis of not only activation of the image forming apparatus but also information which changes in accordance with the number of prints of the image forming apparatus. This can prevent degradation of the sheet end detection means over time, or a decrease in the detection precision of the sheet end detection means caused by toner scattering or the like in the image recording apparatus.

(Fifth Embodiment)

An image forming apparatus according to the fifth embodiment of the present invention will be described with reference to the accompanying drawings. The same reference numerals as in the first embodiment denote the same parts, and a repetitive description thereof will be omitted.

Figure 16:
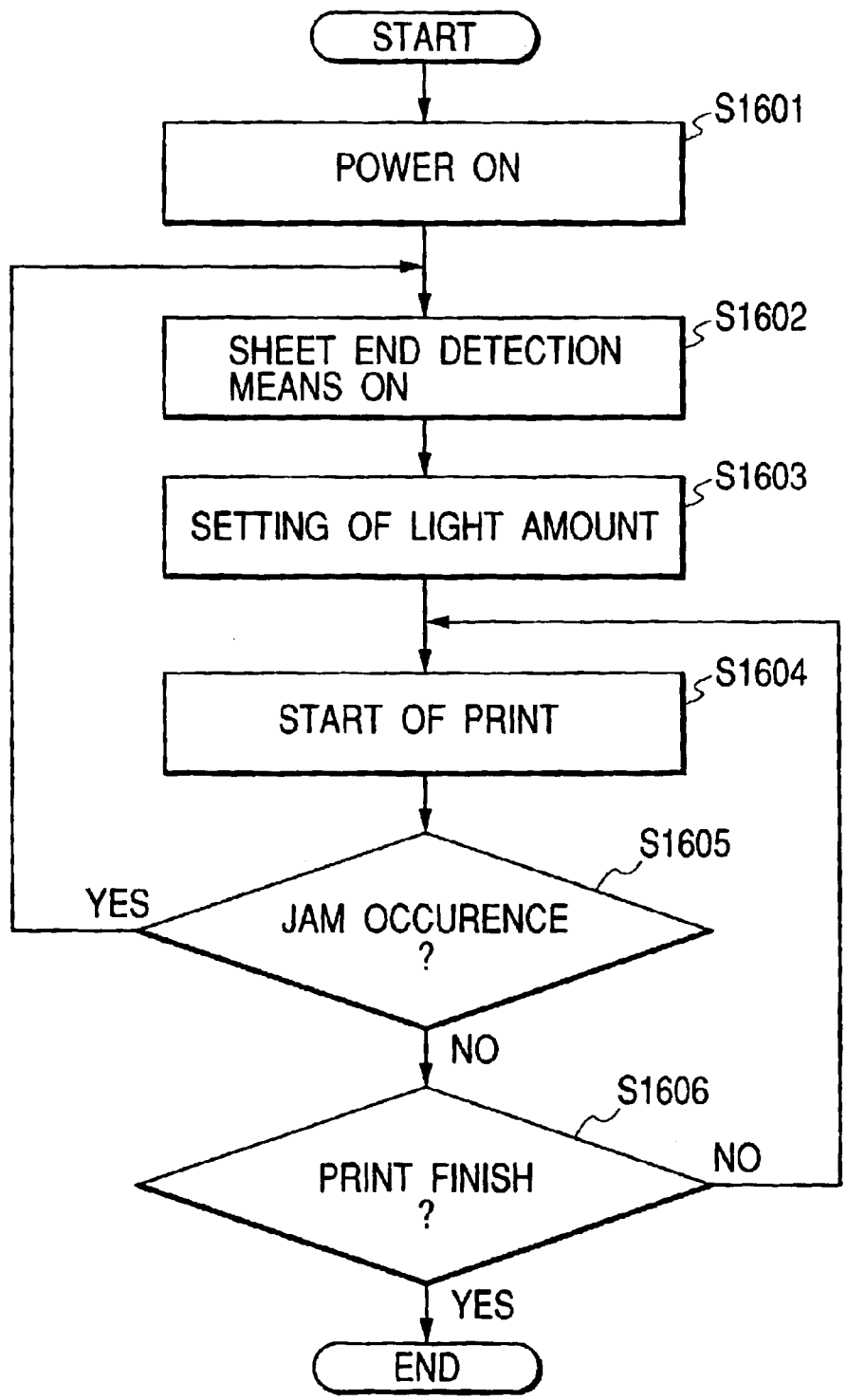
FIG. 16 is a flow chart.
Figure 17:
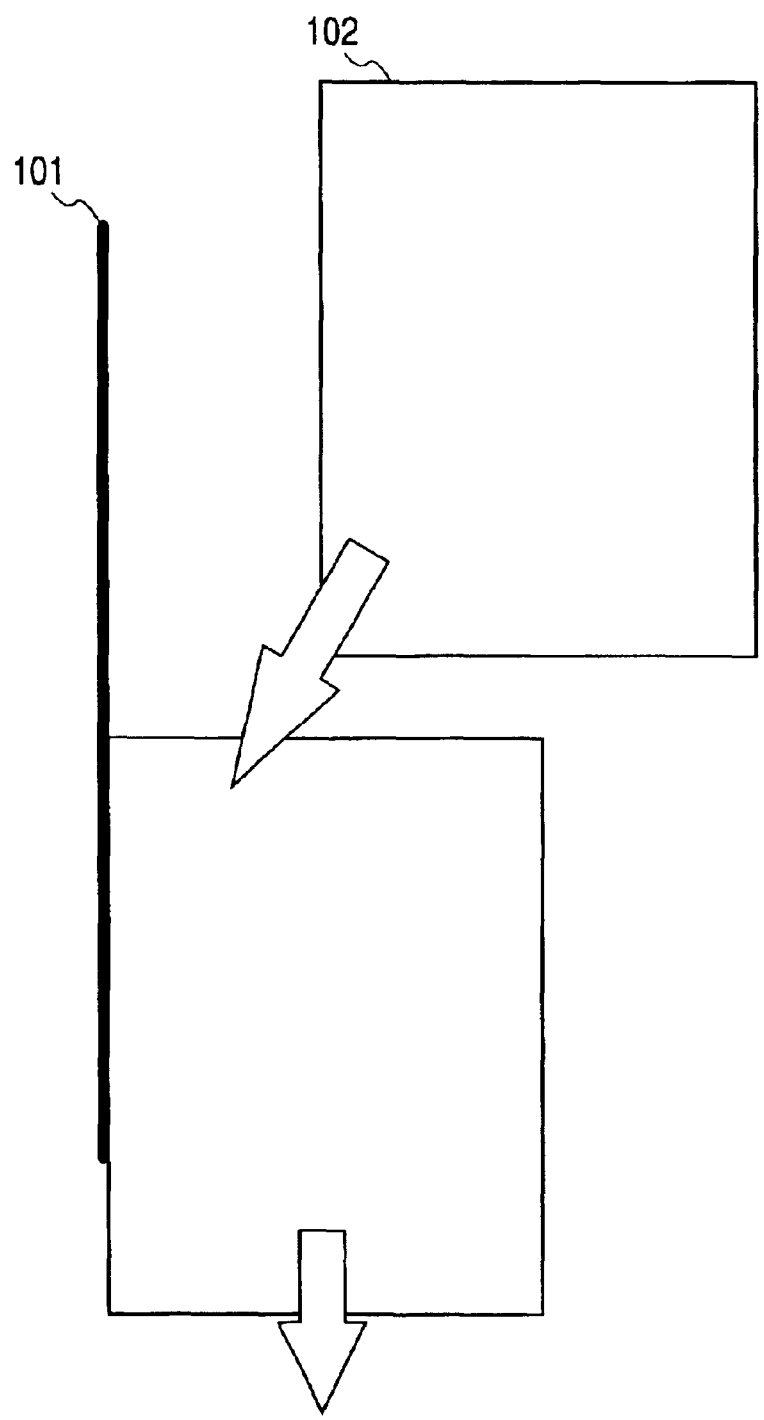
FIG. 17 is a view showing a conventional image write position determination method.
Figure 18:
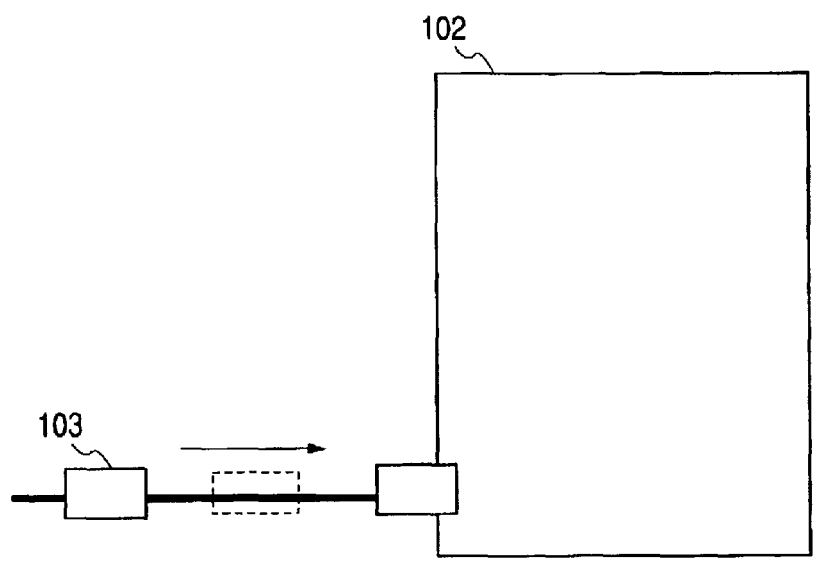
FIG. 18 is a view showing a conventional image write timing correction method.
Figure 19:
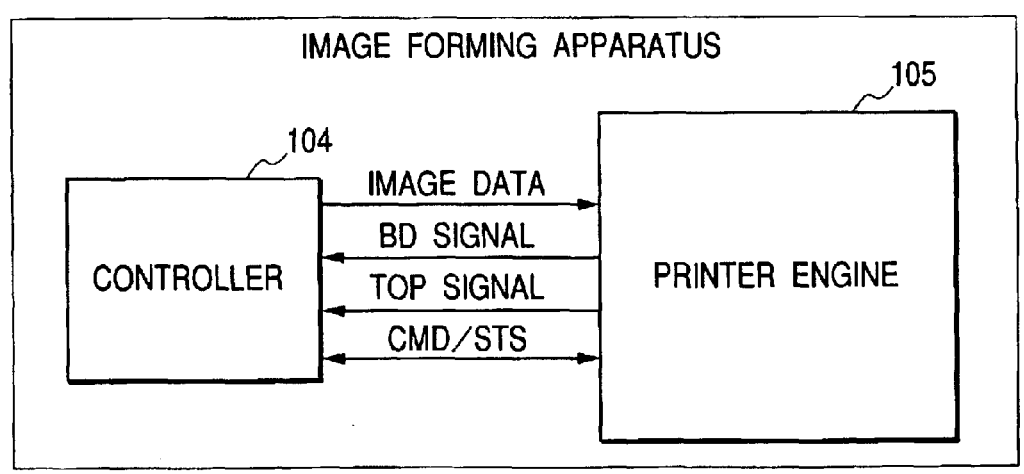
FIG. 19 is a block diagram showing a conventional image forming apparatus.
Figure 20:
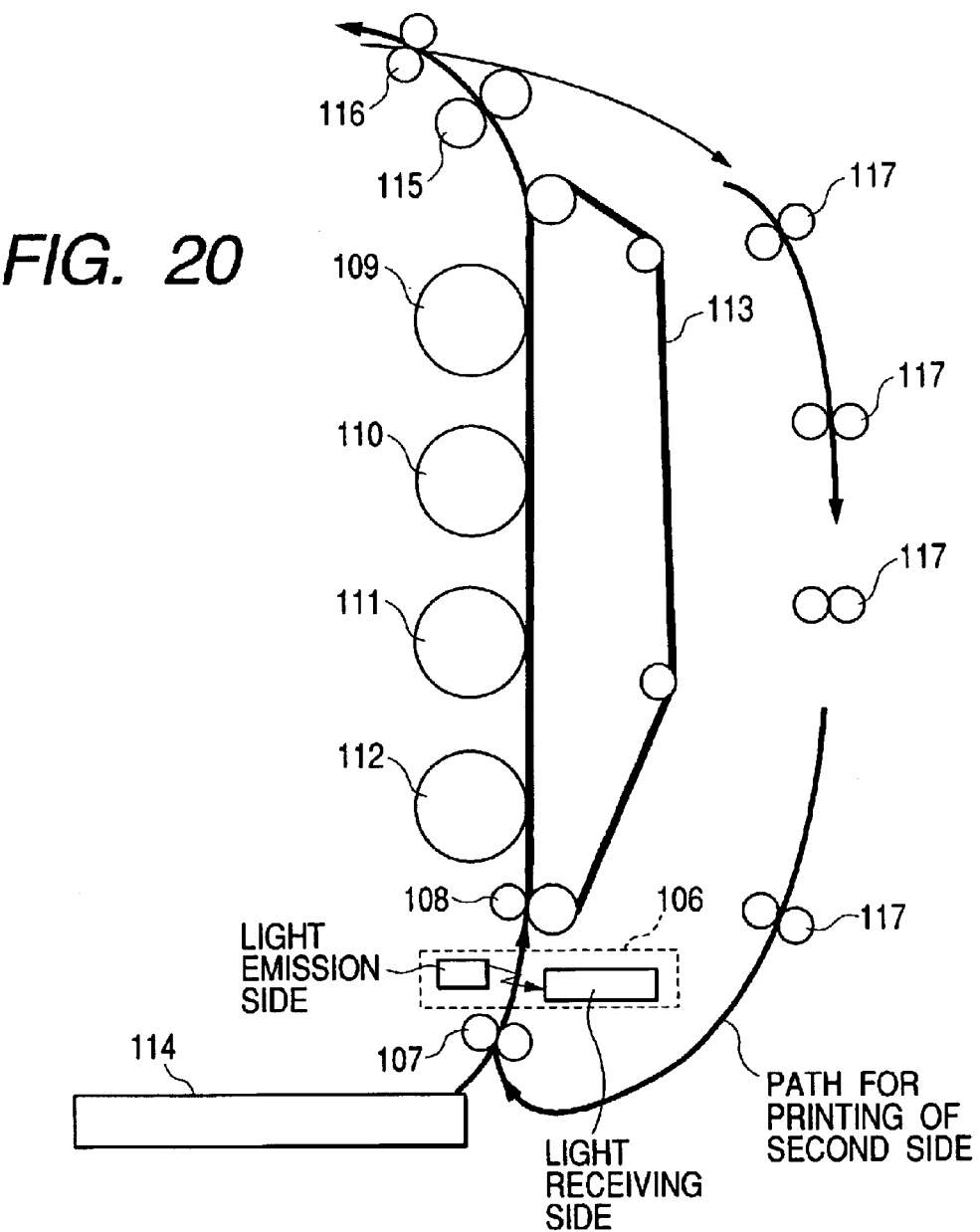
FIG. 20 is a schematic view showing a conventional printer engine.
Figure 21:
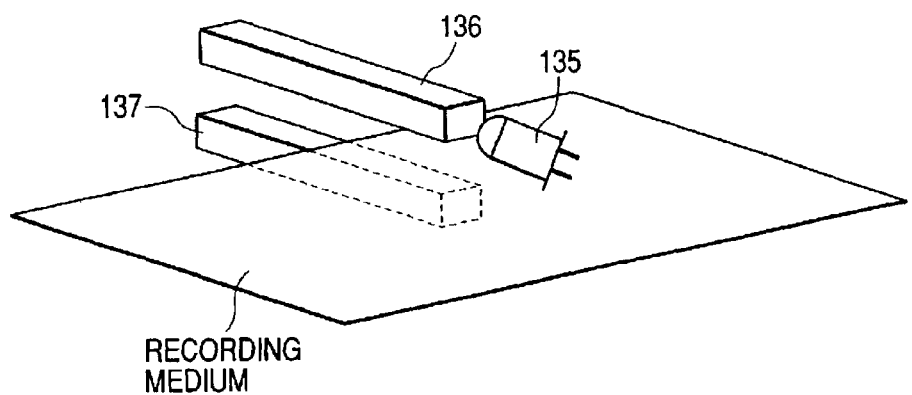
FIG. 21 is a perspective view showing a conventional sheet end detection means.
Figure 22:
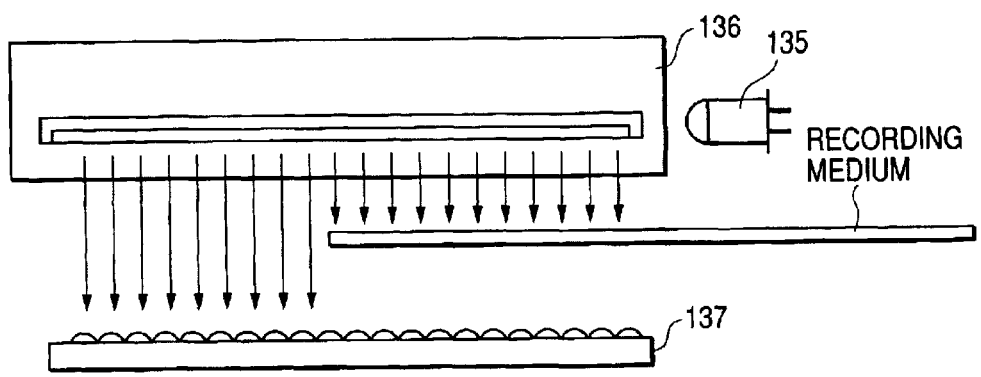
FIG. 22 is a sectional view showing the conventional sheet end detection means.

In the fifth embodiment, the light amount of a sheet end detection means is set in accordance with not only activation of the image forming apparatus but also occurrence of a jam. FIG. 16 is a flow chart showing the fifth embodiment.

After a printer engine 2 is powered on in S1601, a sheet end detection means 3 is turned on in S1602, and the light amount of the sheet end detection means 3 is set in S1603. Printing starts in S1604, and whether a jam has occurred is checked in S1605.

If YES in S1605, the flow returns to S1603 to set the light amount of the sheet end detection means 3; if NO, whether printing has ended is checked in S1606.

If NO in S1606, the flow returns to S1604 to continue printing; if YES, the flow ends.

In the fifth embodiment, the light amount is set upon occurrence of a jam, but the light amount setting execution timing is not limited to occurrence of a jam. Alternatively, the light amount may be set when printing operation fails due to the failure of a fixing unit or motor. Alternatively, the light amount may be set when the door is opened/closed.

As described above, the light emission amount is corrected not only in activation of the image forming apparatus, but also in occurrence of a jam, opening/closing of the door, or the failure of the fixing unit or driving unit. Hence, the abnormal state of the sheet end detection means can be detected in advance.

As has been described above, according to the present invention, the end of a recording medium can always be detected at a proper light amount regardless of the state of the sheet end detection means.

The end of a recording medium can be detected at an optimal light amount for each recording medium size.

In addition, degradation of the sheet end detection means owing to secular change, or a decrease in the detection precision of the sheet end detection means caused by toner scattering or the like within the image recording apparatus can be avoided.

The abnormal state of the sheet end detection means can be detected in advance.

As a result, image information can always be recorded on a recording medium on the basis of a stable end detection result. Information can always be recorded at a proper position, increasing the recording quality.

The present invention is not limited to the above embodiments, and can be modified without departing from the spirit and scope of the invention.

What is claimed is:

1. An image forming apparatus comprising:
    a detector that detects, with a permeable-type optical sensor receiving a light partly shielded by a recording medium, an edge of the recording medium in a direction perpendicular to a recording medium convey direction;
    a write controller that shifts an image write position in the direction perpendicular to the recording medium convey direction on the basis of a detection result of the detector; and
    a light controller that controls a light emission amount of the optical sensor based on an output of the optical sensor.

2. An apparatus according to claim 1, wherein an area where a detection output of the optical sensor is effective is variable.

3. An apparatus according to claim 1, wherein a predetermined portion in an area where the detection result of the optical sensor is effective includes a predetermined position in the area where the detection result of the optical sensor is effective.

4. An apparatus according to claim 3, wherein the predetermined position includes a center in the area where the detection result of the optical sensor is effective.

5. An apparatus according to claim 1, wherein a predetermined portion in an area where the detection result of the optical sensor is effective includes a predetermined output generation portion in the area where the detection result of the optical sensor is effective.

6. An apparatus according to claim 5, wherein the predetermined output generation portion includes one of an output generation portion exhibiting the smallest light receiving amount in the area where the detection result of the optical sensor is effective and an output generation portion exhibiting the smallest output value in the area where the detection result of the optical sensor is effective.

7. An apparatus according to claim 1, wherein the light controller corrects the light emission amount so as to set an output at a predetermined portion in an area where the detection result of the optical sensor is effective to a difference calculated by subtracting a predetermined value from the saturation value of the optical sensor.

8. An apparatus according to claim 1, wherein the light controller corrects the light emission amount to set an output at a predetermined portion in an area where the detection result of the optical sensor is effective to a saturation value of the optical sensor.

9. An apparatus according to claim 1, wherein at least one area where the detection result of the optical sensor is effective is set.

10. An apparatus according to claim 1, wherein correction operation of the light controller is executed separately for plural areas.

11. An apparatus according to claim 1, wherein an area where the edge of the recording medium is detected is selected in accordance with the size of a recording medium to be detected.

12. An apparatus according to claim 1, wherein the write controller shifts the image write position based on the edge position of the recording medium detected by the detector.

13. An apparatus according to claim 1, wherein the write controller shifts the image write position based on information about a shift amount of the recording medium from a reference position that is detected by the detector.

14. An apparatus according to claim 1, wherein an abnormal state of the optical sensor is detected based on a light emission amount correction result of the light controller.

15. An apparatus according to claim 1, wherein the photosensor includes a reflection photosensor.

16. An image forming apparatus comprising:
    a detector that detects, with an optical sensor, an edge of a recording medium in a direction perpendicular to a recording medium convey direction;
    a write controller that shifts an image write position in the direction perpendicular to the recording medium convey direction on the basis of a detection result of the detector; and
    a light controller that corrects a light emission amount of the optical sensor,
    wherein the light controller performs a light amount control operation at a predetermined timing based on information that changes in accordance with a number of prints of the image forming apparatus.

17. An apparatus according to claim 16, wherein the information that changes in accordance with the number of prints includes at least a count value counted in the image forming apparatus in accordance with the number of prints.

18. An apparatus according to claim 16, wherein the information that changes in accordance with the number of prints includes at least residual toner information.

19. An image forming apparatus comprising:
- a detector that detects an end of a recording medium by an optical sensor in a direction perpendicular to a recording medium convey direction;
- a write controller that shifts an image write position in a direction perpendicular to the recording medium convey direction on the basis of a detection result of the detector; and
- a detection controller that variably controls an area where a detection output of the optical sensor becomes effective.

20. An apparatus according to claim 19, wherein the detection controller variably controls the area on the basis of size information of the recording medium.

21. An apparatus according to claim 19, wherein the detection controller generates a control signal for enabling the detection output.

22. An apparatus according to claim 19, wherein the detection controller generates a plurality of control signals for enabling the detection output.

23. An apparatus according to claim 19, wherein the optical sensor is a contact image sensor.

* * * * *

UNITED STATES PATENT AND TRADEMARK OFFICE
CERTIFICATE OF CORRECTION

PATENT NO. : 6,937,263 B2
DATED : August 30, 2005
INVENTOR(S) : Namiki et al.

It is certified that error appears in the above-identified patent and that said Letters Patent is hereby corrected as shown below:

Column 3,
Line 32, "medium" should read -- media --.

Signed and Sealed this

Fourth Day of April, 2006

JON W. DUDAS
*Director of the United States Patent and Trademark Office*